US009799240B2

United States Patent
Han et al.

(10) Patent No.: US 9,799,240 B2
(45) Date of Patent: Oct. 24, 2017

(54) LOW TACK BUBBLE FREE ADVERTISEMENT FILM

(71) Applicant: DONG GUAN ZHONG SHI TUO ENTERPRISE LTD., Dongguan, Guangdong (CN)

(72) Inventors: Jing Han, Dongguan (CN); Fang Yang, Dongguan (CN); Jianwei Liu, Dongguan (CN)

(73) Assignee: DONG GUAN ZHONG SHI TUO ENTERPRISE LTD., Dongguan (CN)

( * ) Notice: Subject to any disclaimer, the term of this patent is extended or adjusted under 35 U.S.C. 154(b) by 0 days.

(21) Appl. No.: 15/188,253

(22) Filed: Jun. 21, 2016

(65) Prior Publication Data

US 2017/0249877 A1 Aug. 31, 2017

(30) Foreign Application Priority Data

Feb. 29, 2016 (CN) .......................... 2016 1 0109307

(51) Int. Cl.
*G09F 7/18* (2006.01)
*C09J 7/02* (2006.01)
*C09J 201/00* (2006.01)

(52) U.S. Cl.
CPC ............... *G09F 7/18* (2013.01); *C09J 7/025* (2013.01); *C09J 7/0264* (2013.01); *C09J 201/00* (2013.01); *C09J 2201/28* (2013.01); *C09J 2205/10* (2013.01); *C09J 2499/00* (2013.01); *C09J 2499/005* (2013.01); *C09J 2499/006* (2013.01)

(58) Field of Classification Search
CPC .. G09F 7/18; C09J 7/025; C09J 7/0264; C09J 201/00; C09J 2201/28; C09J 2205/10; C09J 2499/00; C09J 2499/005; C09J 2499/006
See application file for complete search history.

(56) References Cited

U.S. PATENT DOCUMENTS 4,735,837 A * 4/1988 Miyasaka .............. C09J 7/0207 428/192
8,282,754 B2 * 10/2012 Lorence .................. B32B 27/32 156/84

FOREIGN PATENT DOCUMENTS

| CN | 201099019 Y | 8/2008 |
| CN | 201544556 U | 8/2010 |
| CN | 204296156 U | 4/2015 |
| CN | 204360698 U | 5/2015 |
| CN | 204360722 U | 5/2015 |
| CN | 104943302 A | 9/2015 |
| CN | 204820572 U | 12/2015 |

* cited by examiner

Primary Examiner — Patricia L Nordmeyer
(74) Attorney, Agent, or Firm — HEMISPHERE LAW, PLLC

(57) ABSTRACT

The present invention provides a low tack bubble free advertisement film, comprising an advertisement film layer, a dot glue layer and a release layer; a adhesion promoter layer is disposed between the back face of the advertisement film layer and the dot glue layer; the dot glue layer consists of over four independent, separable glue dots; and the area of the dot glue layer is 30-80% of the adhesion promoter layer. The present invention can provide a special advertisement film in the field of advertising consumables. The advertisement film has many advantages, such as low tack, totally bubble free, removable, and can be pasted for a long time. The present invention provides a convenient, efficient, feasible solution for advertising consumables.

10 Claims, 1 Drawing Sheet

LOW TACK BUBBLE FREE ADVERTISEMENT FILM

BACKGROUND OF THE INVENTION

Technical Field

The present invention relates to the field of advertising consumables, in particular to a low tack bubble free advertisement film.

Description of Related Art

Advertisement film as an advertising consumable has been widely applied to various advertising fields. Along with the development of digital images, more and more advertisement films are used, including large format advertisements, indoor posts, art photos and digital images. The front face of the advertisement film is printed with patterns and characters by colorful ink jet printing, digital printing or traditional ink printing, and the back face is coated with adhesive. Current adhesive advertisement films in market mainly include normal unremovable high tack products with poor bubble free performance during sticking, and some special unremovable high tack products with good bubble free performance, and some removable low tack products with poor bubble free performance. High tack products easily leave adhesive residue on the surface of the substrate, causing late cleaning difficulties and even damage to the surface of the glued object, so high tack products have a narrow application area and are usually disposable, for example, products mentioned in patents CN201510406570.5, CN201420726053.7, CN200920198832.3 and CN200720114828.5. Commercially available removable products usually use low tack pressure sensitive adhesive which do not generate adhesive residue easily. However, the adhesive layer is generally full coated, so air bubbles tend to generate on the adhesive surface during sticking due to poor air venting performance of the adhesive layer, thus affecting the smoothness and application convenience, for example, products mentioned in CN201520267528.5, CN201520019005.9 and CN201520018725.3. Removable adhesive advertising consumables with low tack and good bubble free performance are not seen in the market.

Therefore, development of a removable advertising film which has low tack and high bubble free performance and can be pasted for a long time will be very popular in the market.

BRIEF SUMMARY OF THE INVENTION

In the field of adhesive advertising consumables, the present invention provides a removable low tack bubble free advertisement film and a convenient solution for advertising consumables.

To fulfill the above objectives, the technical solution of the present invention is as follows.

A low tack bubble free advertisement film includes an advertisement film layer, a dot glue layer and a release layer; a adhesion promoter layer is disposed between the back face of the advertisement film layer and the dot glue layer; the dot glue layer consists of over four independent, separable glue dots; and the area of the dot glue layer is 30-80% of the adhesion promoter layer.

Each glue dot of the dot glue layer is shaped as any one of a cylinder, cube, cuboid, cone, trapezoid, prism, hollow roundness, semi-sphere and small semi-sphere.

The diameter of each glue dot is 0.1-5 mm, and the thickness is 0.005-2 mm.

Venting gaps are formed between the glue dots, and the width of the venting gaps is 0.02-5 mm.

The 180° peel force of the dot glue layer is 0.01-3N/25 mm.

The main chemical ingredient of the glue dots is one or more of polyacrylate, polysiloxane, polyurethane, rubber and thermoplastic elastomer; the construction viscosity of dot glue is 1,000-50,000 mpa·s. If the viscosity is smaller than 1,000 mPa·s, it is difficult to form glue dots; if the viscosity is greater than 50,000 mPa·s, coating work becomes difficult due to high viscosity.

The advertisement film layer is any one or two of PET film, PP film, PP synthetic paper, PVC film, PC film, PS film, PE film and PI film.

The front face of the advertisement film layer is coated with a printing adaptive layer; the printing adaptive layer is used for ink jet printing of UV ink, Eco-solvent ink, water-based ink and HP latex ink, HP Indigo digital printing, laser carbon powder printing and traditional ink printing; and the thickness of the printing adaptive layer is 0.2-50 μm.

The release layer is any one of PP film, PET film, PE film and PP release film, PET release film, PE release film and release paper which have silicon oil or fluoride-containing releasing agent.

A preparation method of the low tack bubble free advertisement film is provided, characterized by including the steps of: coating a adhesion promoter layer on the back face of the advertisement film layer, copying regular glue dots on the adhesion promoter layer by using a release layer transfer coating method, and forming gaps between glue dots to generate good bubble free performance.

The present invention has the following beneficial effects:

1. The present invention can provide a special advertisement film in the fields of advertising consumables. The advertisement film is easy to apply and to reposition because of low tack and excellent bubble free performance. The present invention provides a convenient, efficient, feasible solution for advertising consumables.

2. In the present invention, the adhesion promoter layer consists of a coupling reagent and a primer adhesion promoter, so the glue dots still have high adhesion to the base film even if under the condition of a medium-low peel force.

3. In the present invention, the adhesion promoter layer coated on the back face of the advertisement film is partially glued by using the release layer transfer coating method; the size and shape of the partial glue dots can be freely adjusted according to demand; the gaps between the glue dots can form air path channels when the advertisement film is pasted, so the product has good bubble free performance, and can be perfectly pasted manually without using any tool and without air bubbles.

Figure 1:
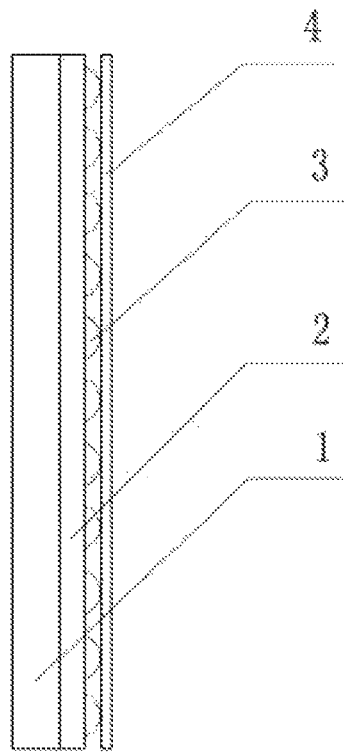
FIG. 1 is a sectional view of the main body structure of the present invention.
Figure 2:
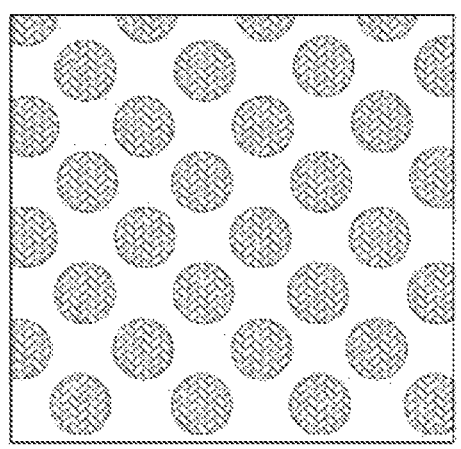
FIG. 2 is a front view of the dot glue layer with the release film in FIG. 1 removed.

As shown in the figure, 1. advertisement film layer; 2. adhesion promoter layer; 3. dot glue layer; 4. release layer.

DETAILED DESCRIPTION OF THE INVENTION

An embodiment of the present invention is further described with reference to the attached drawings.

A low tack bubble free advertisement film includes an advertisement film layer, a dot glue layer and a release layer; a adhesion promoter layer is disposed between the back face of the advertisement film layer and the dot glue layer; the dot glue layer consists of over four independent, separable glue dots; and the area of the dot glue layer is 30-80% of the adhesion promoter layer.

The shape of each glue dot of the dot glue layer can be randomly selected, for example any one of a cylinder, cube, cuboid, cone, trapezoid, prism, hollow roundness, semi-sphere and small semi-sphere.

The diameter of the glue dot can be 0.1-5 mm, preferably 0.5-2 mm; and the thickness of the glue dot layer can be 0.005-2 mm, preferably 0.01-1 mm.

Venting gaps are formed between the glue dots, and the width of the venting gaps is 0.02-5 mm.

The 180° peel force of the dot glue layer is 0.01-3N/25 mm.

The main chemical ingredient of the glue dots is one or more of polyacrylate, polysiloxane, polyurethane, rubber and thermoplastic elastomer.

The advertisement film layer is any one or two of PET film, PP film, PP synthetic paper, PVC film, PC film, PS film, PE film and PI film.

The front face of the advertisement film layer is coated with a printing adaptive layer; the printing adaptive layer is used for ink jet printing of UV ink, Eco-solvent ink, water-based ink and HP latex ink, HP Indigo digital printing, laser carbon powder printing and traditional ink printing; and the thickness of the printing adaptive layer is 0.2-50 μm.

The release layer is any one of PP film, PET film, PE film and PP release film, PET release film, PE release film and release paper which have silicon oil or fluoride-containing releasing agent.

A preparation method of the low tack bubble free advertisement film includes the steps of: coating a adhesion promoter layer on the back face of the advertisement film layer, copying regular glue dots on the adhesion promoter layer by using a release layer transfer coating method, and forming gaps between glue dots to generate good bubble free performance.

The performance of the low tack bubble free advertisement films prepared in embodiments 1-3 of the present invention are compared with the current advertisement films. Comparison results can be seen in the table below.

Two current advertisement films are provided, namely the high tack advertisement film in Contrast Example 1 and the low tack advertisement film in Contrast Example 2.

|  | Embodiment 1 | Embodiment 2 | Embodiment 3 | Contrast Example 1 | Contrast Example 2 |
| --- | --- | --- | --- | --- | --- |
| Glue layer structure | Glue dot | Glue dot | Glue dot | full coating | full coating |
| Thickness of the glue layer (mm) | 0.03 | 0.06 | 0.1 | 0.05 | 0.05 |
| Diameter of the glue dot (mm) | 0.2 | 0.5 | 1 |  |  |
| Coverage rate of the glue layer % | 75 | 60 | 50 | 100 | 100 |
| Peel force (N/25 mm) | 0.6 | 1 | 0.9 | 5 | 0.6 |
| Air bubbles generated during sticking | No | No | No | Yes | Yes |
| Removability | Yes | Yes | Yes | No | Yes |

From the table above, it can be seen that, the low tack bubble free advertisement film prepared by the present invention has obvious superiorities in bubble free performance and recyclability in comparison with the prior art.

The above embodiments have no limit in the technical scope of the present invention. Any changes, equivalent changes and modifications made on the basis of the concept of the present invention according to the above embodiments shall fall within the scope of the technical solution of the present invention.

What is claimed is:

1. A low tack bubble free advertisement film, comprising an advertisement film layer, a dot glue layer and a release layer; wherein an adhesion promoter layer is disposed between the back face of the advertisement film layer and the dot glue layer, the adhesion promoter layer consists of a coupling reagent and a primer adhesion promoter; the dot glue layer consists of over four independent, separable glue dots, each of the glue dots has a first surface contacting with the adhesion promoter layer and a second surface facing away from the adhesion promoter layer, and the release layer contacts with the second surface of each of the glue dots; and the area of the dot glue layer is 30-80% of the adhesion promoter layer.

2. The low tack bubble free advertisement film according to claim 1, characterized in that each glue dot of the dot glue layer is shaped as any one of a cylinder, cube, cuboid, cone, trapezoid, prism, hollow roundness, semi-sphere and small semi-sphere.

3. The low tack bubble free advertisement film according to claim 1, characterized in that the diameter of each glue dot is 0.1-5 mm, and the thickness is 0.005-2 mm.

4. The low tack bubble free advertisement film according to claim 1, characterized in that venting gaps are formed between the glue dots, and the gap width is 0.02-5 mm.

5. The low tack bubble free advertisement film according to claim 1, characterized in that the 180° peel force of the dot glue layer is 0.01-3N/25 mm.

6. The low tack bubble free advertisement film according to claim 1, characterized in that the main chemical ingredient of the glue dots is one or more of polyacrylate, polysiloxane, polyurethane, rubber and thermoplastic elastomer; and the construction viscosity of dot glue is 1,000-50,000 mpa·s.

7. The low tack bubble free advertisement film according to claim 1, characterized in that the advertisement film layer is any one or two of polyethylene terephthalate (PET) film, polypropylene (PP) film, polypropylene (PP) synthetic paper, polyvinyl chloride (PVC) film, polycarbonate (PC) film, polystyrene (PS) film, polyethylene (PE) film and polyimide (PI) film.

8. The low tack bubble free advertisement film according to claim 1, characterized in that the front face of the advertisement film layer is coated with a printing adaptive layer; the printing adaptive layer is used for ink jet printing, digital printing and laser carbon powder printing; and the thickness of the printing adaptive layer is 0.2-50 μm.

9. The low tack bubble free advertisement film according to claim 1, characterized in that the release layer is any one of polypropylene (PP) film, polyethylene terephthalate (PET) film, polyethylene (PE) film and polypropylene (PP) release film, polyethylene terephthalate (PET) release film, polyethylene (PE) release film and release paper which have silicon oil or fluoride-containing releasing agent.

10. The low tack bubble free advertisement film according to claim 1, characterized in that a preparation method comprises: coating a adhesion promoter layer on the back face of the advertisement film layer, copying regular glue dots on the adhesion promoter layer by using a release layer transfer coating method, and forming gaps between glue dots to generate good bubble free performance.

* * * * *